No. 678,640. Patented July 16, 1901.
E. R. CAMPBELL.
NUT LOCK.
(Application filed May 23, 1901.)
(No Model.)
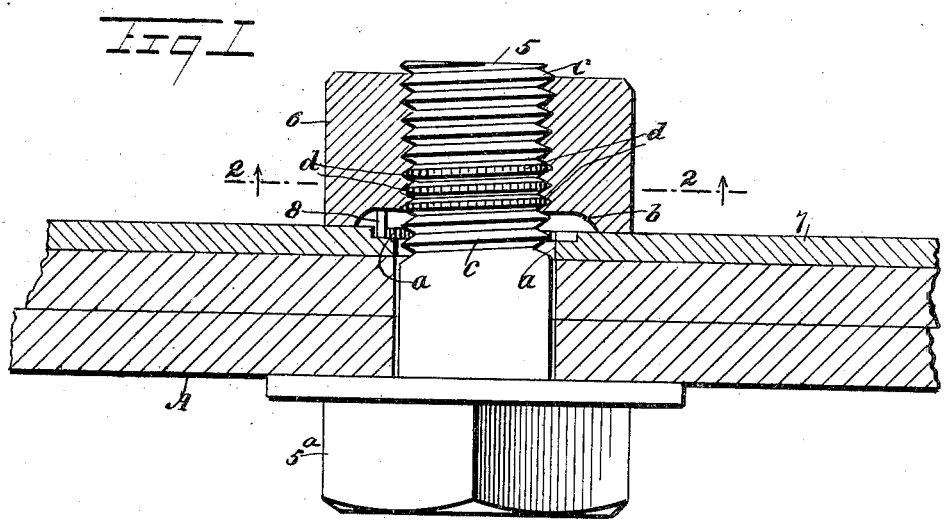
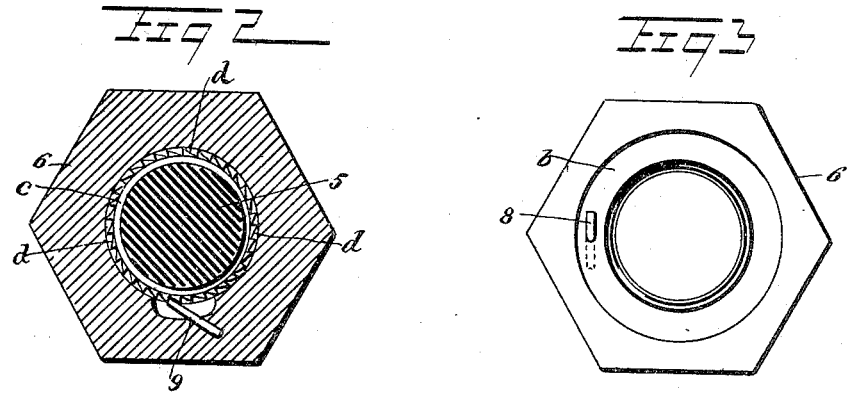
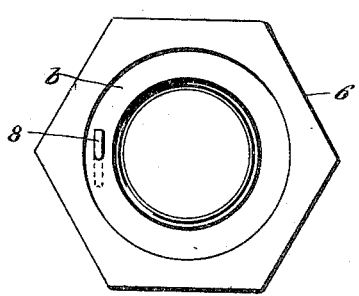
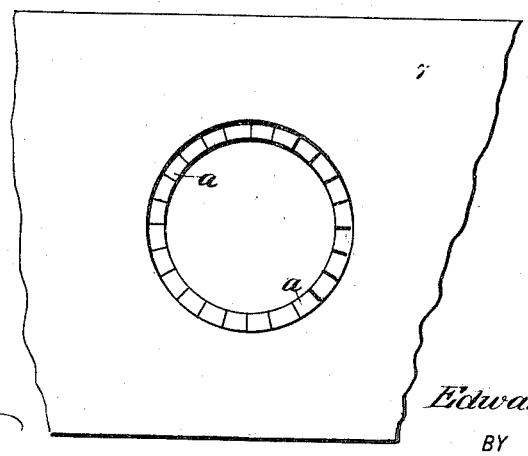
WITNESSES:
H. H. Walker
Wm. T. Patton
INVENTOR
Edward R. Campbell
BY
ATTORNEYS

UNITED STATES PATENT OFFICE.

EDWARD R. CAMPBELL, OF EAST RYEGATE, VERMONT.

NUT-LOCK.

SPECIFICATION forming part of Letters Patent No. 678,640, dated July 16, 1901.

Application filed May 23, 1901. Serial No. 61,543. (No model.)

*To all whom it may concern:*

Be it known that I, EDWARD R. CAMPBELL, a citizen of the United States, and a resident of East Ryegate, in the county of Caledonia and State of Vermont, have invented a new and Improved Nut-Lock, of which the following is a full, clear, and exact description.

This invention has for its object to provide a simple and effective nut-lock of the ratchet type; and it consists in the novel construction and combination of parts, as is hereinafter described, and defined in the appended claims.

Reference is to be had is the accompanying drawings, forming a part of this specification, in which similar characters of reference indicate corresponding parts in all the figures.

Figure 1 is a sectional side view of the improvement applied. Fig. 2 is a transverse sectional view of the nut, substantially on the line 2 2 in Fig. 1, seen in the direction of the arrows. Fig. 3 is a reverse plan view of the nut detached from the bolt, and Fig. 4 is a plan view of a novel construction of one form of the member to be secured by the nut-lock.

On the threaded bolt 5 is screwed the nut 6, so as to contact with a plate 7 of suitable area to have proper frictional contact with material A, or said plate may be dispensed with and the material A be the object held by the bolt and through which the bolt-body passes. The head 5ª of the bolt may contact with the material A when the bolt and nut are employed to secure together two pieces thereof, which is one of the different uses for which the lock-nut may be employed. The plate 7 is provided with a series of ratchet-teeth *a*, circularly arranged around the edge of the round aperture, as clearly shown in Fig. 4.

As above stated, the plate 7 may be dispensed with, in which case the circularly-arranged series of teeth *a* will be produced in the material A.

An annular cupped cavity *b* is formed in the surface of the nut 6, which in service is adjacent to the face of the plate 7 or material A, and from said annular cavity a spring-pawl 8 projects, said pawl being suitably inclined and having such proportionate length as will adapt it to engage between appropriate teeth of the series of teeth *a* when the nut is secured upon the bolt-body 5, so as to bear forcibly upon the plate 7 or material A when the parts are arranged for service, as represented in Fig. 1.

On the thread *c* of the bolt 5 a plurality of ratchet-teeth *d* are formed, and from the body of the nut 6 a spring-pawl 9 projects diagonally toward the teeth in a proper direction, the pawl having such length as will permit its free end to contact with the teeth *d* and interlock between the adjacent teeth of the series, as clearly shown in Fig. 2.

In operation the body of the bolt 5 is inserted through a hole in the material and also through the plate 7, that is to be held thereby, or through the material A only, the head of the bolt bearing on said material or plate, and then the nut 6 is screwed upon the bolt, so as to contact with the plate or with the material A. As the nut is turned the pawl 8 engages with the series of teeth *a* and obviously retains the nut in locked engagement with the plate 7 or material A, and by its frictional contact with the plate or the material A is prevented from rotative movement, or the plate may be held in place by a plurality of bolts, as in the case of a railway fish-plate. As the pawl 9 engages with the ratchet-teeth *d* on the thread *c* when the nut is screwed down upon the bolt-body, it will be seen that reverse rotative movement of the nut is thus prevented, so that when the nut has been screwed to a proper bearing upon the plate 7 or material A the nut will be effectively locked both upon the bolt-body and upon the plate or upon said material A.

Having thus described my invention, I claim as new and desire to secure by Letters Patent—

1. A nut-lock, comprising a nut, a pawl in the nut adapted to engage teeth on the thread of a bolt whereon the nut is screwed, and a second pawl in the nut, adapted to engage teeth on the material to be secured by the nut and bolt.

2. A nut-lock, comprising a nut having a pawl projected toward the thread on a bolt, a series of teeth on the thread of the bolt whereon the nut screws, said pawl having engagement with the teeth on the bolt-thread when the nut is screwed upon said thread, a plate having teeth around its opening, and a pawl on the nut adapted to engage said teeth when the nut is screwed upon the bolt-body and contacts with the plate.

3. A nut-lock, comprising a nut having a pawl projected toward the thread on a bolt, a series of teeth on the thread of the bolt whereon the nut screws, said pawl having engagement with the teeth on the bolt-thread when the nut is screwed upon said thread, a plate having a series of ratchet-teeth on the edge around the orifice in the plate, and two oppositely-projecting spring-pawls extended in a cavity in the nut toward said teeth on the plate, and engaging therewith when the nut bears upon said plate.

In testimony whereof I have signed my name to this specification in the presence of two subscribing witnesses.

EDWARD R. CAMPBELL.

Witnesses:
C. M. WALLACE,
GEO. B. WALLACE.